United States Patent
Davis et al.

(10) Patent No.: US 11,895,078 B2
(45) Date of Patent: Feb. 6, 2024

(54) SYSTEM FOR COMMUNICATING AMONG END-USER DEVICES HAVING DIFFERENT MESSAGE CHANNEL FORMATS AND ASSOCIATED METHODS

(71) Applicant: EAGLE TECHNOLOGY, LLC, Melbourne, FL (US)

(72) Inventors: John M. Davis, Brentwood, TN (US); John-Paul Sitarski, Reston, VA (US); Michael Milazzo, Centreville, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 43 days.

(21) Appl. No.: 17/455,440

(22) Filed: Nov. 18, 2021

(65) Prior Publication Data
US 2023/0155976 A1   May 18, 2023

(51) Int. Cl.
*H04L 51/56* (2022.01)
*H04L 51/066* (2022.01)

(52) U.S. Cl.
CPC ............ *H04L 51/56* (2022.05); *H04L 51/066* (2013.01)

(58) Field of Classification Search
CPC .............................. H04L 51/56; H04L 51/066
See application file for complete search history.

(56) References Cited

U.S. PATENT DOCUMENTS

| | | | |
|---|---|---|---|
| 5,701,423 A | 12/1997 | Crozier | |
| 6,295,561 B1 | 9/2001 | Nagy | |
| 8,144,730 B2 | 3/2012 | Maleport et al. | |
| 2006/0031584 A1 | 2/2006 | McKinley et al. | |
| 2012/0124672 A1* | 5/2012 | Krishnamurthy | H04L 51/52 709/206 |
| 2016/0036743 A1* | 2/2016 | Rosen | H04L 63/105 709/206 |
| 2020/0228389 A1* | 7/2020 | Ros | H04L 69/18 |

\* cited by examiner

*Primary Examiner* — Austin J Moreau
(74) *Attorney, Agent, or Firm* — ALLEN, DYER, DOPPELT, + GILCHRIST, P.A.

(57) ABSTRACT

A communications system may include end-user devices (EUDs), a communications network, and a message processor. A message parser determines, from a received message, a message originator EUD having an associated originator message channel format, and at least one intended message recipient EUD with an associated recipient message channel format. A message channel database includes respective different message channel formats for different EUDs. A message recaster cooperates with the message parser and message channel database and transmits at least one recast message based upon the received message, which may include a corresponding recipient message channel format with a corresponding Internet Protocol (IP) address for the at least one intended recipient EUD.

21 Claims, 4 Drawing Sheets

SYSTEM FOR COMMUNICATING AMONG END-USER DEVICES HAVING DIFFERENT MESSAGE CHANNEL FORMATS AND ASSOCIATED METHODS

FIELD OF THE INVENTION

The present invention relates to the field of communications, and, more particularly, to a communications system that receives and transmits messages among end-user devices and related methods.

BACKGROUND OF THE INVENTION

There is often the need to communicate among different end-user devices that each may use a different infrastructure, device application, communications medium, or communications backbone network. Some communication systems integrate disparate systems and applications by 1:1 automated protocol translation of messages between two disparate communication devices or by employing a manual forwarding process. In other systems, an intermediate processor may be customized for a dedicated, fixed integration with constrained bridging capability. To accommodate differing applications or communications environments, other communications systems incorporate a media gateway as a translation service that converts media streams between different telecommunications formats and enables multimedia communications across packet networks. The media gateway converts between different encoding techniques, and may include echo cancellation and DTMF and tone sender functions.

For example, a media gateway may connect a public land mobile network to a public switched telephone network (PSTN) using an IP network. Although there is some translation from an end-user device on the PSTN to an end-user device on the IP network, the media gateway is still limited in providing communications among different end-user devices because a media gateway usually translates the physical or data link layer for interoperability. Some protocol translators use media CODECS to interoperate among end-user devices, for example, protocols that are software installed on routers, which convert the data format, data rate, and protocols of one network into the data format, data rate, and protocols of the other network where the data is transmitted.

Other communications systems use fixed data protocol translation tables for 1:1 import/export operations, including database schema look-up tables. None of these systems, however, provide a virtual message channel for real-time heterogeneous communications between different end-user devices that may use different message channel formats.

SUMMARY OF THE INVENTION

In general, a communications system may include a plurality of end-user devices (EUDs) and a communications network for the plurality of EUDs. A message processor may be coupled with the communications network and may comprise a message parser configured to determine, from a received message, a message originator EUD with an associated originator message channel format, and at least one intended message recipient EUD with an associated recipient message channel format. The message processor may further comprise a message channel database of respective different message channel formats for different EUDs, and a message recaster cooperating with the message parser and message channel database and configured to transmit at least one recast message based upon the received message and having a corresponding recipient message channel format with a corresponding Internet Protocol (IP) address for the at least one intended recipient EUD.

The message recaster may be configured to select at least one message channel through the communications network. The message processor may comprise a communications network channel monitor cooperating with the message recaster to select the at least one message channel through the communications network. In an example, the message recaster may be operable based upon at least one trigger event. In yet another example, the message recaster may be operable based upon a determined position of the originator EUD.

The at least one intended recipient EUD may comprise a plurality of intended recipient EUDs. The message recaster may be operable based upon a determined position of the at least one recipient EUD. The received message may comprise at least one of a formatted text message, and a chat message.

Another aspect is directed to a method of operating a communications system that may comprise a plurality of end-user devices (EUDs) and a communications network therefor. The method includes operating a message parser to determine, from a received message, a message originator EUD with an associated originator message channel format, and at least one intended message recipient EUD with an associated recipient message channel format, and operating a message channel database of respective different message channel formats for different EUDs. The method further includes operating a message recaster cooperating with the message parser and message channel database to transmit at least one recast message based upon the received message and having a corresponding recipient message channel format with a corresponding Internet Protocol (IP) address for the at least one intended recipient EUD.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
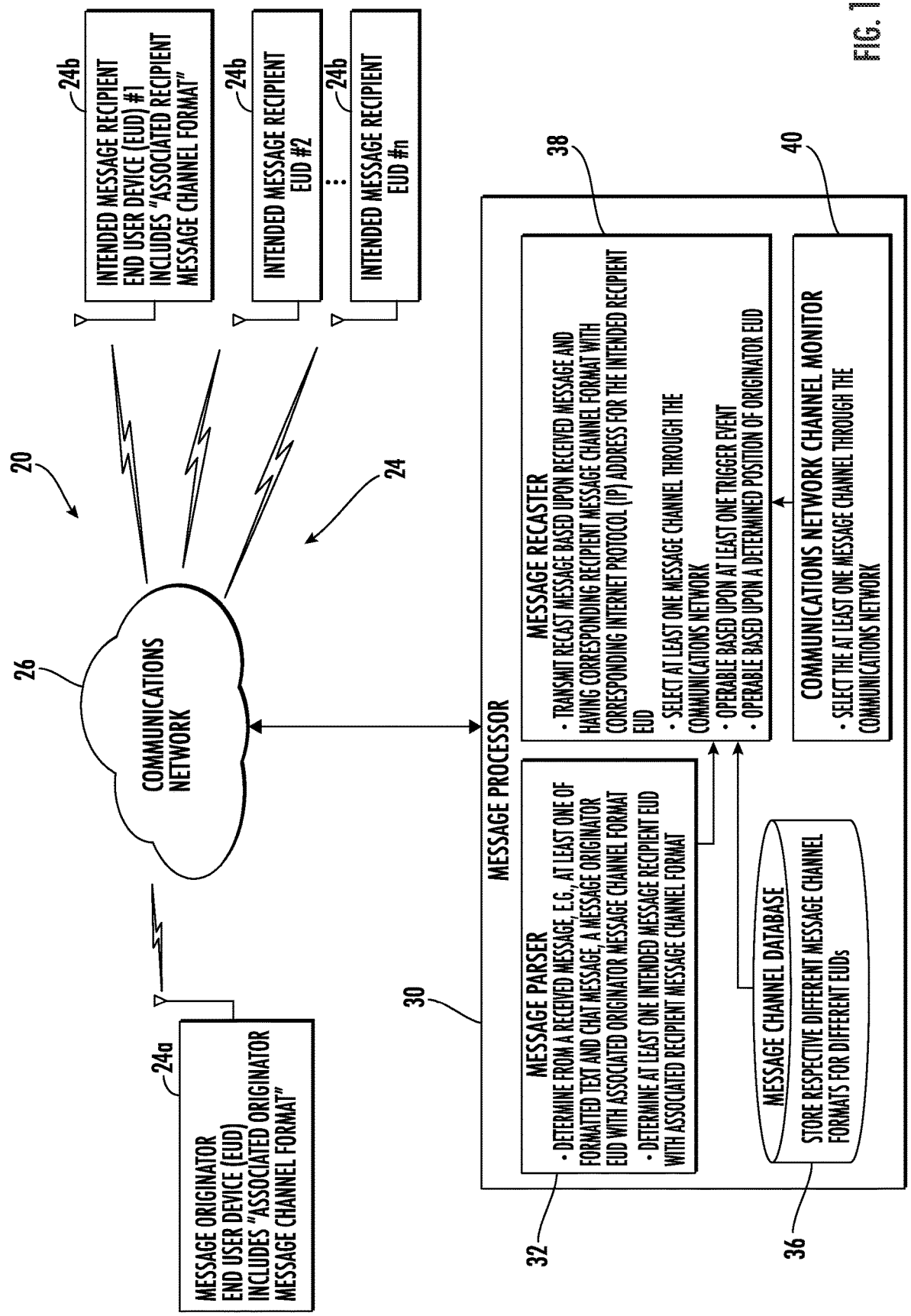
FIG. 1 is a block diagram of the communications system showing different end-user devices and the message processor that receives and transmits recast messages to one or more end-user devices in a different message channel format in accordance with a non-limiting example.

Referring initially to FIG. 1, a communications system is illustrated generally at 20 and shows a plurality of end-user devices (EUDs) indicated generally at 24. A communications network 26 for the plurality of EUDs 24 allows communication from a message originator EUD 24a that includes an associated originator message channel format to intended message recipient EUDs 24b that each may include an associated recipient message channel format. A plurality of intended message recipient EUDs 24b are illustrated and numbered 1 to "n." The intended message recipient EUDs 24b may be the same or different EUDs, such as an Iridium NAL Shout, an iPhone SMS user, and a device employing a mIRC channel as non-limiting examples.

A message processor 30 is coupled to the communications network 26 and includes a message parser 32 configured to determine, from a received message, the message originator EUD 24a with the associated originator message channel format, and at least one intended message recipient EUD 24b with its associated recipient message channel format.

The message processor 30 also includes a message channel database 36 that stores respective different message channel formats for different EUDs 24. A message recaster 38 cooperates with the message parser 32 and message channel database 36 and is configured to transmit at least one recast message based upon the received message, and having a corresponding recipient message channel format with a corresponding internet protocol (IP) address for the at least one intended message recipient EUD 24b. The message recaster 38 may be configured to select at least one message channel through the communications network 26. The message recaster 38 may be operable based upon at least one trigger event and based upon a determined position of the message originator EUD 24a. It may also be operable based upon the determined position of the at least one intended message recipient EUD 24b. The received message from the message originator EUD 24a may include at least one of a formatted text message and a chat message as non-limiting examples. As illustrated in FIG. 1, the at least one intended message recipient EUD 24b includes a plurality of intended message recipient EUDs as noted above and illustrated as EUD No. 1 to EUD "n."

In an example, the message processor 30 includes a communications network channel monitor 40 cooperating with the message recaster 38 to select the at least one message channel through the communications network 26. It is possible to monitor the message channel based upon changing channel conditions, and switch to a different message channel when conditions deteriorate in the original message channel.

Figure 2:
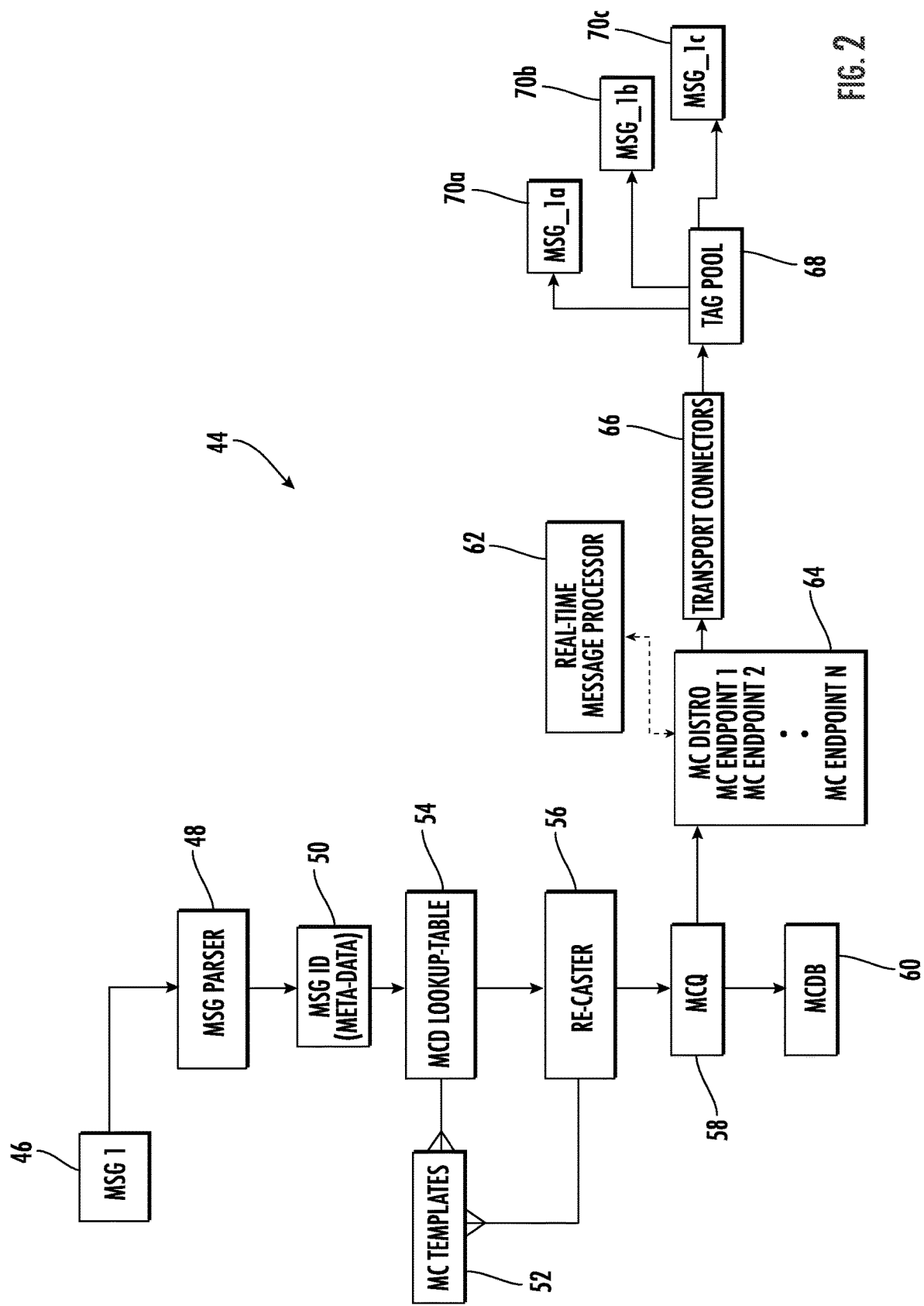
FIG. 2 is a flowchart illustrating a functional message flow in the communications system of FIG. 1.

Referring now to FIG. 2, a flowchart indicated generally at 44 illustrates a functional message flow and the recasting of at least one recast message based upon the received message for a message channel within the communications network 26. A message originator EUD 24a transmits a message labeled as Msg 1 (Block 46) from a native application into the communications network 26 via a message channel. The message parser 32 at the message processor 30 receives the message (Block 48). Each message payload may be defined as a Core Information Element (CIE) that is processed by the message processor 30 at its message parser 32, which directly or indirectly discerns the CIE identifier and a message ID (Block 50) as metadata for the message channel and maps the content to a proper message channel template (Block 52) with the aid of a message channel look-up table (Block 54) as part of the message channel database 36.

At this point, the message recaster 38 permutes the message into all registered endpoint formats (Block 56) for the message channel and simultaneously writes to an output message channel queue (MCQ) (Block 58) and into the message channel database 36 (Block 60). The message processor 30 via its message recaster 38 monitors different trigger events within the communications data payload and any metadata (Block 62) to execute a corresponding action. Different message channel endpoints as intended message recipient end-user devices 24b may have endpoint message variances that are distributed (Block 64) to respective transport connectors (Block 66) and then evaluated by a Transport Aggregation Gateway (TAG) pool (Block 68) that operate as a gateway for routing data to the various intended message recipient EUDs 24b as the endpoints indicated by the message 1A (70a), message 1B (70b), and message 1C (70c) that include the different message channels. The intended message recipient EUDs 24b may have multiple application endpoints that are well defined, and all may be targeted in the message recaster 38 and may be prioritized, with only the highest priority messages reaching an intended message recipient EUD 24b.

At the message processor 30, the message payload and its CIE identifier may be dynamically replicated as a message payload into an endpoint format and allocation based upon the channel member data stored in the message channel database 36, which includes channel member user definitions. It is possible that a recipient message channel format and its corresponding IP address may be reassigned on an active channel, and each of the intended message recipient EUDs 24b can simultaneously receive the message on multiple communication paths each having different message channel formats. Different trigger events on which the message recaster 38 operates and cooperates with the message parser 32 and message channel database 36 may transmit the different recast messages and may include a combination of different application types used by the different intended message recipient EUDs 24b. Any data elements may be filtered and include different data formatting for each intended message recipient EUD 24b.

The message processor 30 operates as a message channel intermediary between the message originator EUD 24a and any intended message recipient EUDs 24b and may process data from the message originator EUD based upon various triggers and associated processing rules, including geofencing, event-driven events, data rate changes, message channel conditions, and similar events that may affect the condition of a message channel. The message processor 30 may look at the enumerated triggers and rules for originating the Core Information Elements (CIE) for gathering data and meta-data for analysis/evaluation against rules under which the message processor may synthesize organic messages, thus, adding new content beyond originators and EUD source data. The message processor 30 may be part of a cloud-based communications network 26 and include artificial intelligence and machine learning traffic processing to implement quicker and more responsive selection and changes to recipient message channel formats. The message processor 30 may provide data integrity checks with transaction histories stored in the message channel database 36. In an example, the message channel database 36 may be a structured query language (SQL) or non-structured query language (NOSQL) message channel database.

The message processor 30 creates a message channel between the message originator EUD 24a and any intended message recipient EUDs 24b and integrates the EUDs into a single virtual communications network, regardless of the communications medium among the different EUDs or the endpoint type. The message processor 30 modifies and translates data content to a native format for one or more of the intended message recipient EUDs 24b and may initiate or supplement event-driven or interpolated data content to the message channel. The message processor 30 allows the message originator EUD 24a to communicate with the intended message recipient EUDs 24b whether the EUDs are operating across the same or different communication platforms, different operating systems, and even varying, incompatible transport mechanisms.

Figure 3:
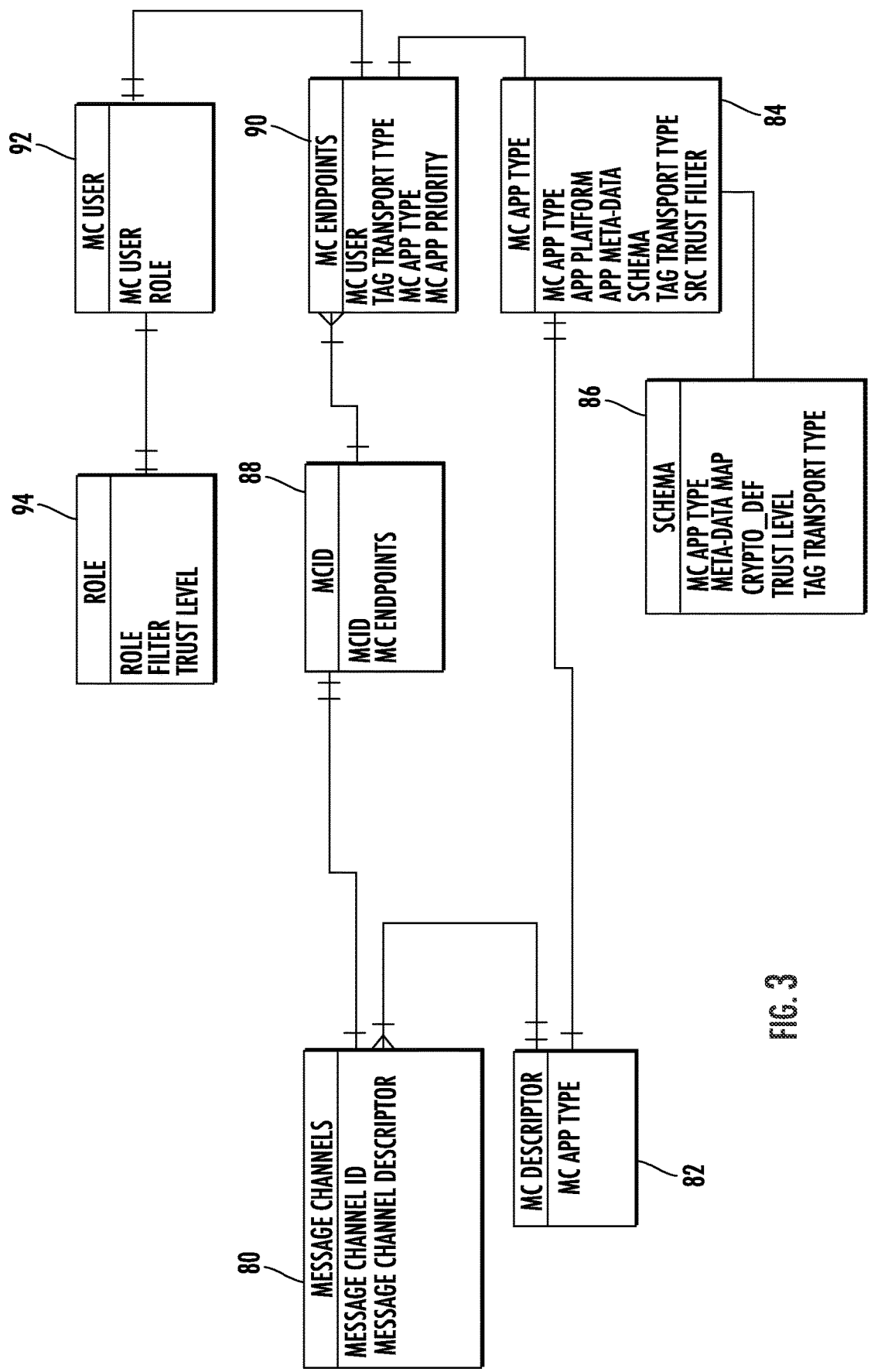
FIG. 3 is a schematic block diagram showing the factors that impact the message channel format in the communications system of FIG. 1.

Referring now to FIG. 3, a schematic block diagram shows the factors that impact the message channel format in the communications system 20 of FIG. 1. The message channels (Block 80) include a message channel ID and message channel descriptor that may be defined and stored in the message channel database 36. For example, the message channel descriptor (Block 82) may include a message channel application type, which includes the specific software application, the application platform, any application metadata associated with the application, the schema, the TAG transport type, and any specific type of filtering for trusted applications or data (Block 84). The schema (Block 86) associated with the message channel application type (Block 84) may include a message channel application type and a mapping to the metadata, any cryptographic data definitions, including trust levels for encryption, and the TAG transport type.

The message channel ID (Block 88) may include data regarding the message channel endpoints pertaining to specific intended message recipient EUDs 24b. The message channel endpoints (Block 90) may include data regarding the message channel, user, the tag transport type, the message channel application type, and any message channel application priorities, where different intended message recipient EUDs 24b may be prioritized. The message channel user (Block 92) corresponding to the specific intended message recipient EUDs 24b may include any active roles (Block 94) such as trust levels and data filters.

The message channel application type (Block 84) may drive the data formatting and delivery where membership in different message channels may depend on a role of an intended message recipient EUD 24b within any prioritized end-user applications. The message channel may be optimized for an intended message recipient EUD 24b type, role, and bandwidth with different plug-ins and "out-of-the-box" end-user device support. Message channels may be defined by the intended message recipient EUD 24b and its application data type and any protocol support and capability. The bandwidth of the source and destination channel may be taken into consideration. Further filtering or element customization or permissions may be used. Priority may include any hierarchical path configurations that may include less capable but accessible message channel paths and CIE types. The message processor 30 via its message recaster 38 make supplement content with richer CIE format for more capable communication message channels. The communications network channel monitor 40 may manually or automatically adjust the message channel data type selection and the different intended message recipient EUDs 24b may receive status metrics from the message processor 30 related to the infrastructure of the communications network 26 and dynamically select a destination path for an intended message recipient EUD.

The message processor 30 may be a cloud-based message processor operating on a cloud-based service, such as the Amazon Web Service (AWS), in order to expand data capabilities and communications than more traditional direct communications or translation gateways. The message processor 30 may integrate redundant communications paths as part of the Transport Agnostic Gateway (TAG) and provide the most cost-effective and available transport to different intended message recipient EUDs 24b, which can be prioritized in order with alternate message channels operating for different intended message recipient EUDs as other channels become available.

The message processor 30 may also operate similar to a proxy and virtual server that includes filtering of data elements for size, trust, or role adaptation and reformat and transcode the supported formats for an intended message recipient EUD 24b. Different conditional triggers and rules may be defined for the message processor 30, such as the data rate and content-based or event-driven multi-message parameter processing.

Figure 4:
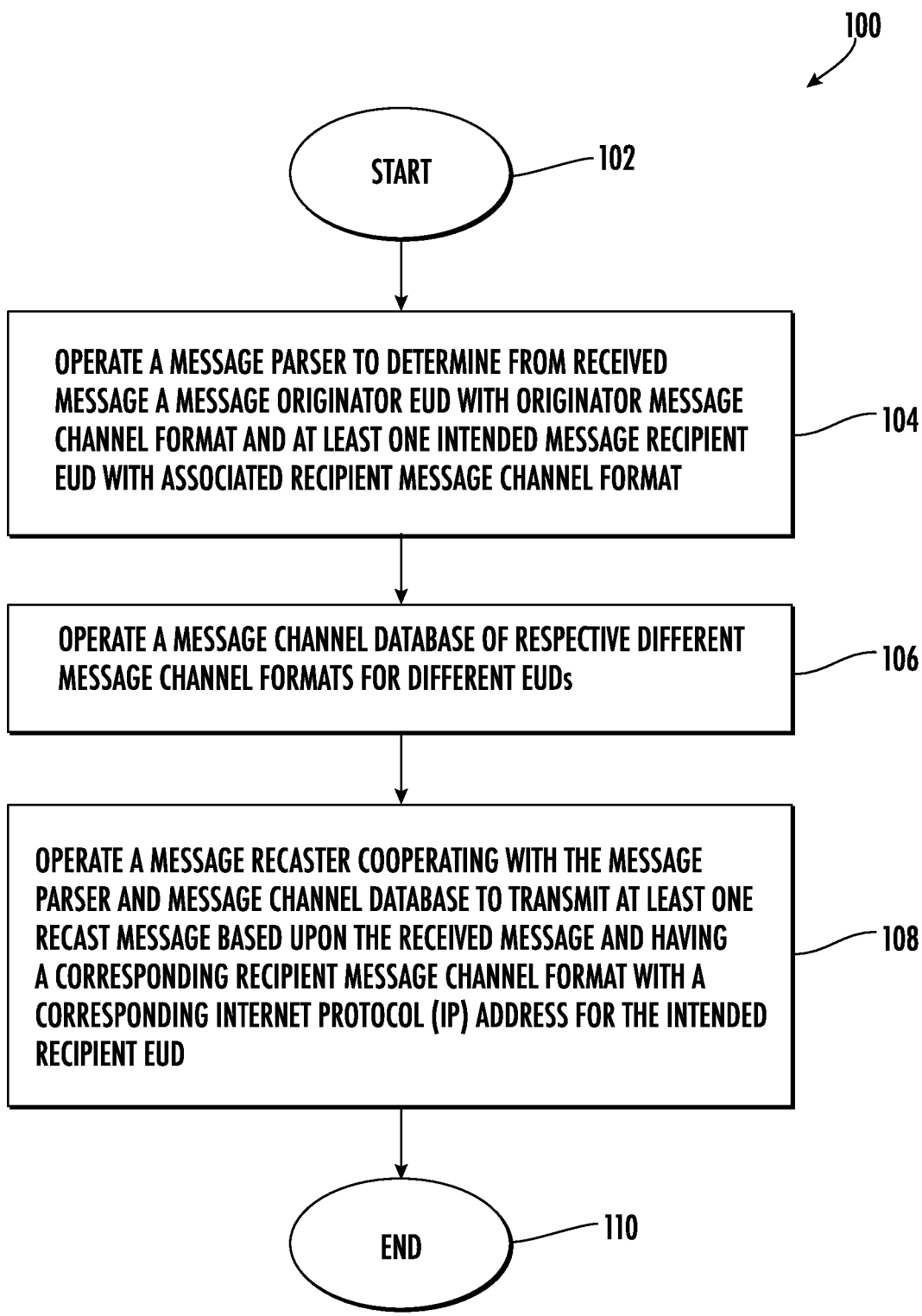
FIG. 4 is a high-level flowchart showing a method of operating the communications system of FIG. 1.

Referring now to FIG. 4, a high-level flowchart of a method of operating the communications system 20 of FIG. 1 is illustrated generally at 100. The process starts (Block 102) and the message parser 32 is operated to determine from a received message a message originator EUD 24a with an originator message channel format and at least one intended message recipient EUD 24b with an associated recipient message channel format (Block 104). The message channel database 36 is operated for the respective different message channel formats with different EUDs 24 (Block 106). The message recaster 38 is operated and cooperates with the message parser 32 and message channel database 36 to transmit at least one recast message based upon the received message and includes a corresponding recipient message channel format with a corresponding internet protocol (IP) address for the intended recipient EUD (Block 108). The process ends (Block 110).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A communications system comprising:
   a plurality of end-user devices (EUDs);
   a communications network for the plurality of EUDs; and
   a message processor coupled with the communications network and comprising:
      a message parser configured to determine, from a received message, a message originator EUD with an associated originator message channel format, a position of the originator EUD, and at least one intended message recipient EUD with an associated recipient message channel format,
      a message channel database of respective different message channel formats for different EUDs, each message channel format stored within the message channel database as a registered endpoint format; and
      a message recaster operable based upon the position of the originator EUD and cooperating with the message parser and message channel database and configured to permute the received message into all registered endpoint formats and transmit at least one recast message based upon the received message and having a corresponding recipient message channel format with a corresponding Internet Protocol (IP) address for the at least one intended recipient EUD.

2. The communications system of claim 1 wherein the message recaster is configured to select at least one message channel through the communications network.

3. The communications system of claim 2 wherein the message processor comprises a communications network channel monitor cooperating with the message recaster to select the at least one message channel through the communications network.

4. The communications system of claim 1 wherein the message recaster is operable based upon at least one trigger event.

5. The communications system of claim 1 wherein the at least one intended recipient EUD comprises a plurality of intended recipient EUDs.

6. The communications system of claim 1 wherein the message recaster is operable based upon a determined position of the at least one recipient EUD.

7. The communications system of claim 1 wherein the received message comprises at least one of a formatted text message, and a chat message.

8. A message processor for a communications system comprising a plurality of end-user devices (EUDs), and a communications network for the plurality of EUDs, the message processor to be coupled with the communications network comprising:
a message parser configured to determine, from a received message, a message originator EUD with an associated originator message channel format, a position of the originator EUD, and at least one intended message recipient EUD with an associated recipient message channel format;
a message channel database of respective different message channel formats for different EUDs, each message channel format stored within the message channel database as a registered endpoint format; and
a message recaster operable based upon the position of the originator EUD and cooperating with the message parser and message channel database and configured to permute the received message into all registered endpoint formats and transmit at least one recast message based upon the received message and having a corresponding recipient message channel format with a corresponding Internet Protocol (IP) address for the at least one intended recipient EUD.

9. The message processor of claim 8 wherein the message recaster is configured to select at least one message channel through the communications network.

10. The message processor of claim 9 wherein the message processor comprises a communications network channel monitor cooperating with the message recaster to select the at least one message channel through the communications network.

11. The message processor of claim 8 wherein the message recaster is operable based upon at least one trigger event.

12. The message processor of claim 8 wherein the at least one intended recipient EUD comprises a plurality of intended recipient EUDs.

13. The message processor of claim 8 wherein the message recaster is operable based upon a determined position of the at least one recipient EUD.

14. The message processor of claim 8 wherein the received message comprises at least one of a formatted text message, and a chat message.

15. A method of operating a communications system comprising a plurality of end-user devices (EUDs) and a communications network therefor, the method comprising:
operating a message parser to determine, from a received message, a message originator EUD with an associated originator message channel format, a position of the originator EUD, and at least one intended message recipient EUD with an associated recipient message channel format;
operating a message channel database of respective different message channel formats for different EUDs, each message channel format stored within the message channel database as a registered endpoint format; and
operating a message recaster based upon the position of the originator EUD and cooperating with the message parser and message channel database to permute the received message into all registered endpoint formats and transmit at least one recast message based upon the received message and having a corresponding recipient message channel format with a corresponding Internet Protocol (IP) address for the at least one intended recipient EUD.

16. The method of claim 15 comprising operating the message recaster to select at least one message channel through the communications network.

17. The method of claim 16 comprising operating a communications network channel monitor cooperating with the message recaster to select the at least one message channel through the communications network.

18. The method of claim 15 comprising operating the message recaster based upon at least one trigger event.

19. The method of claim 15 wherein the at least one intended recipient EUD comprises a plurality of intended recipient EUDs.

20. The method of claim 15 comprising operating the message recaster based upon a determined position of the at least one recipient EUD.

21. The method of claim 15 wherein the received message comprises at least one of a formatted text message, and a chat message.

* * * * *